(12) United States Patent
Sasanuma et al.

(10) Patent No.: US 11,983,383 B2
(45) Date of Patent: May 14, 2024

(54) DISPLAY CONTROL DEVICE AND DISPLAY CONTROL METHOD

(71) Applicant: Nissan Motor Co., Ltd., Yokohama (JP)

(72) Inventors: Yasutomo Sasanuma, Kanagawa (JP); Jun Ueda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/628,283

(22) PCT Filed: May 28, 2021

(86) PCT No.: PCT/JP2021/020485
§ 371 (c)(1),
(2) Date: Jan. 19, 2022

(87) PCT Pub. No.: WO2022/249471
PCT Pub. Date: Dec. 1, 2022

(65) Prior Publication Data
US 2023/0367447 A1 Nov. 16, 2023

(51) Int. Cl.
*G06F 3/04817* (2022.01)
*G06F 3/04845* (2022.01)
(Continued)

(52) U.S. Cl.
CPC ...... *G06F 3/04817* (2013.01); *G06F 3/04845* (2013.01); *G06F 3/0486* (2013.01); *G06F 3/04886* (2013.01)

(58) Field of Classification Search
CPC ..... G06T 13/80; G06T 11/00; G06T 2200/24; G06V 20/176; G06F 3/0482; G06F 3/04817; G06F 3/0485; G06F 3/0488; G06F 3/04883; G06F 3/04842; G06F 3/04845; G06F 3/0483; G06F 3/0486; G06F 3/0481; G06F 3/04886; G06F 3/017; G06F 3/0484; G06F 3/04847; G06F 3/0489; G06F 2203/04803; G06F 2203/0381; G06F 3/0346; G06F 3/04812; G06F 16/24553; G06F 18/22; G06F 21/62; G06F 2203/0339; G06F 3/016; G06F 3/0236;
(Continued)

(56) References Cited

U.S. PATENT DOCUMENTS

2017/0192642 A1* 7/2017 Fishman ............... G06F 3/0488

FOREIGN PATENT DOCUMENTS

JP 2012-230571 A 11/2012

* cited by examiner

*Primary Examiner* — Rayeez R Chowdhury
(74) *Attorney, Agent, or Firm* — Global IP Counselors, LLP

(57) ABSTRACT

A display control device includes a display and a controller. The display is configured to be installed in a vehicle and capable of touch operation. The controller configured to control an image displayed on the display. The controller detects a start trigger indicating that a user has started scrolling to the left or right on the display, and increases a relative position between a tile and an icon at a prescribed acceleration with a passage of time from detection of the start trigger. The controller detects a stop trigger indicating that the user has stopped scrolling, and reduces the relative position between the tile and the icon at a prescribed deceleration with a passage of time from detection of the detected stop trigger.

11 Claims, 7 Drawing Sheets

(51) Int. Cl.
*G06F 3/0486* (2013.01)
*G06F 3/04886* (2022.01)

(58) Field of Classification Search
CPC ...... G06F 3/03547; G06F 9/451; G06F 16/44;
G06F 16/743; G06F 16/90335; G06F
21/32; G06F 3/013; G06F 3/048; G06F
3/14; G06F 3/167; G06F 40/174; G06F
8/60
See application file for complete search history.

DISPLAY CONTROL DEVICE AND DISPLAY CONTROL METHOD

CROSS-REFERENCE TO RELATED APPLICATIONS

This application is a U.S. national stage application of International Application No. PCT/JP2021/020485, filed on May 28, 2021.

BACKGROUND

Technical Field

The present invention relates to a display control device and a display control method.

Background Information

An invention for searching for a target display item from a scroll display is known from the prior art (see, Japanese Laid Open Patent Application No. 2012-230571—hereinafter referred to as Patent Document 1). In the invention disclosed in Patent Document 1, when an item matching a prescribed search condition is displayed on a screen, the scroll display is controlled to be a slower speed than usual.

SUMMARY

However, in the invention disclosed in Patent Document 1, the rendering of a parallax effect on the screen on which icons are displayed in front of tiles is insufficient.

In view of the problem described above, an object of the present invention is to provide a display control device and a display control method that can emphasize that an icon is displayed in front of a tile on a screen.

A display control device according to one aspect of the present invention detects a start trigger indicating that a user has started scrolling to the left or a right on a display, increases the relative position between a tile and an icon at a prescribed acceleration with the passage of time from the detected start trigger, detects a stop trigger indicating that the user has stopped scrolling, and reduces the relative position between the tile and the icon at a prescribed deceleration with the passage of time from the detected stop trigger.

By means of the present invention, it is possible to emphasize the fact that a screen is one on which an icon is displayed in front of a tile.

BRIEF DESCRIPTION OF THE DRAWINGS

Referring now to the attached drawings which form a part of this original disclosure.

DETAILED DESCRIPTION OF EMBODIMENTS

Figure 1:
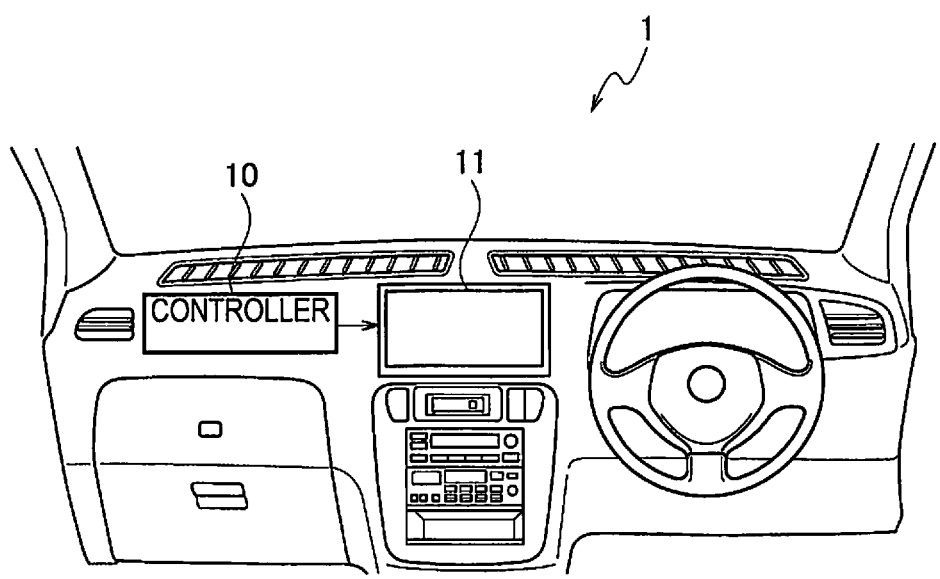
FIG. 1 is a configuration diagram of a display control device 1 according to an embodiment of the present invention.

An embodiment of the present invention is described below with reference to the drawings. In the descriptions of the drawings, identical parts have been assigned the same reference numerals, and the descriptions thereof have been omitted.

A configuration example of a display control device 1 will be described with reference to FIG. 1. The display control device 1 is installed in a vehicle. As shown in FIG. 1, the display control device 1 comprises a controller 10 and a display 11. The display 11 is a touch panel capable of touch operation.

The controller 10 controls an image displayed on the display 11. The controller 10 is a general-purpose microcomputer comprising a CPU (central processing device), memory, and an input/output unit. A computer program is installed in the microcomputer to cause it to function as the display control device 1. By executing the computer program, the microcomputer functions as a plurality of information processing circuits included in the display control device 1. Here, an example is shown in which the plurality of information processing circuits included in the display control device 1 is realized by software, but the information processing circuits can of course comprise dedicated hardware for executing each of the information processes shown below. In addition, the plurality of information processing circuits may be realized by discrete hardware.

Figure 2:
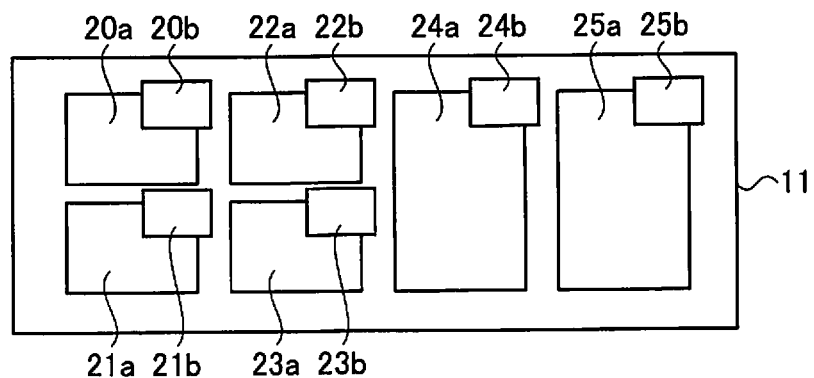
FIG. 2 is a diagram for explaining an example of an image displayed on a display 11.

One example of an image that is displayed on the display 11 will be described next with reference to FIG. 2. As shown in FIG. 2, a plurality of tiles 20a-25a are displayed on the display 11. A tile is an image for activating an application. A user touches a tile to thereby activate a desired application. Types of applications include phone, route guidance, video playback, and music playback.

An icon relating to the tile (application) is displayed on each tile. In the present embodiment, as shown in FIG. 2, an icon 20b is displayed as overlapping a tile 20a. In FIG. 2, a part of the icon 20b overlaps the tile 20a, but is not limited thereto. The entire icon 20b may overlap the tile 20a. It is sufficient if at least a part of the icon 20b overlaps the tile 20a. The same applies to icons 21b-25b. In FIG. 2, the icons 20b-25b overlap at the upper right of the tiles 20a-25a, but the present invention is not limited thereto. In addition, the shape of the icon and the tile is rectangular, but the shape is not limited thereto, and may be circular.

Figure 3:
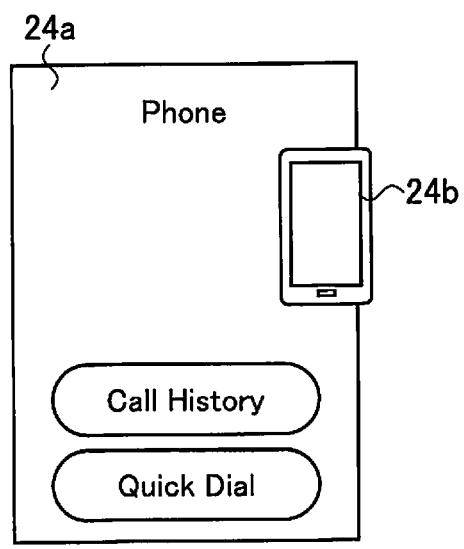
FIG. 3 is a diagram for explaining an example of a tile 24a and an icon 24b.

In the description above, it is described that a phone is included in the application type, but a specific example thereof will be described with reference to FIG. 3. In FIG. 3, the tile 24a and the icon 24b are taken as representative examples from among the plurality of tiles and icons. As shown in FIG. 3, the images "Call History" and "Quick Dial" are included in the tile 24a. If the user touches "Call History," the call history is displayed. If the user touches "Quick Dial," the last called number is called. As shown in FIG. 3, the shape of the icon 24b is that of a smartphone. That is, the icon 24b has a shape relating to the tile 24a (phone). The user can look at the icon 24b and ascertain at a glance that the tile 24a is related to a phone. That is, the icon 24b is an image that can indicate, to the user, information relating to the application (the one that is activated by touching the tile 24a). The same applies to the other icons 20b-23b, 25b. In the case of a music playback tile, an image related to the currently playing musical piece may be employed as the image. The position of the icon 24b is different between FIG. 2 and FIG. 3. This is to explain that the position of the icon 24b is not limited.

The movements of the tiles and the icons, which are controlled by the controller 10 will be described next with reference to FIGS. 4-7. T=0-3 shown in FIG. 4 and T=4-9 shown in FIG. 6 correspond to the time (T) shown in FIG. 7.

Figure 4:
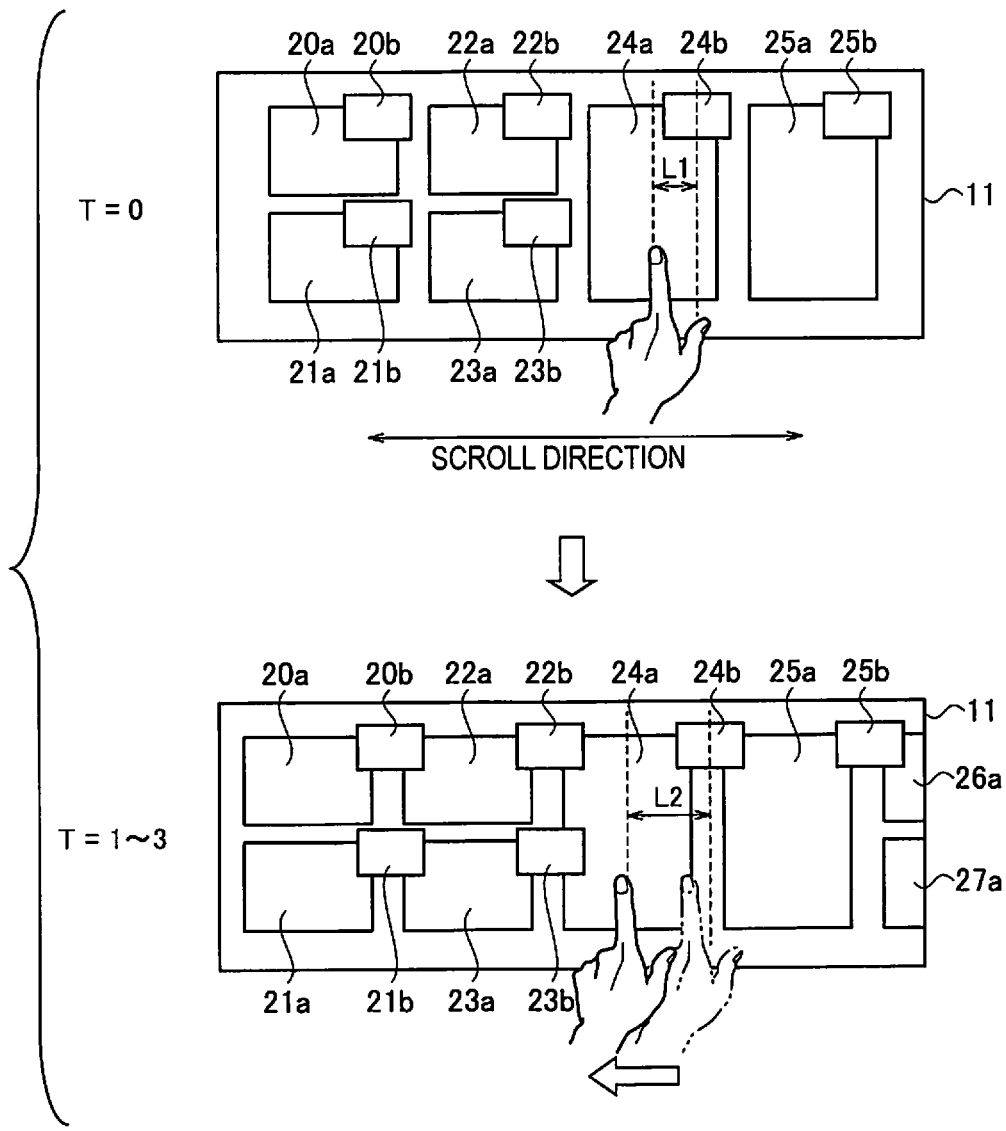
FIG. 4 is a diagram for explaining an example of movement of tiles 20a-25a and icons 20b-25b.
Figure 5:
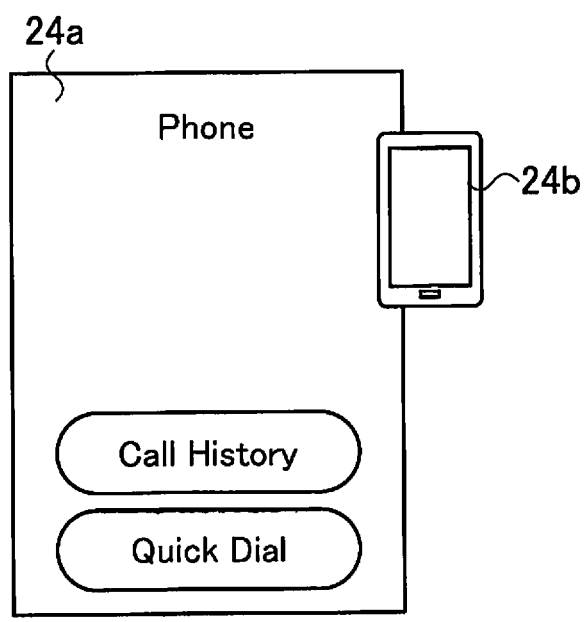
FIG. 5 is a diagram for explaining an example of the tile 24a and the icon 24b.
Figure 6:
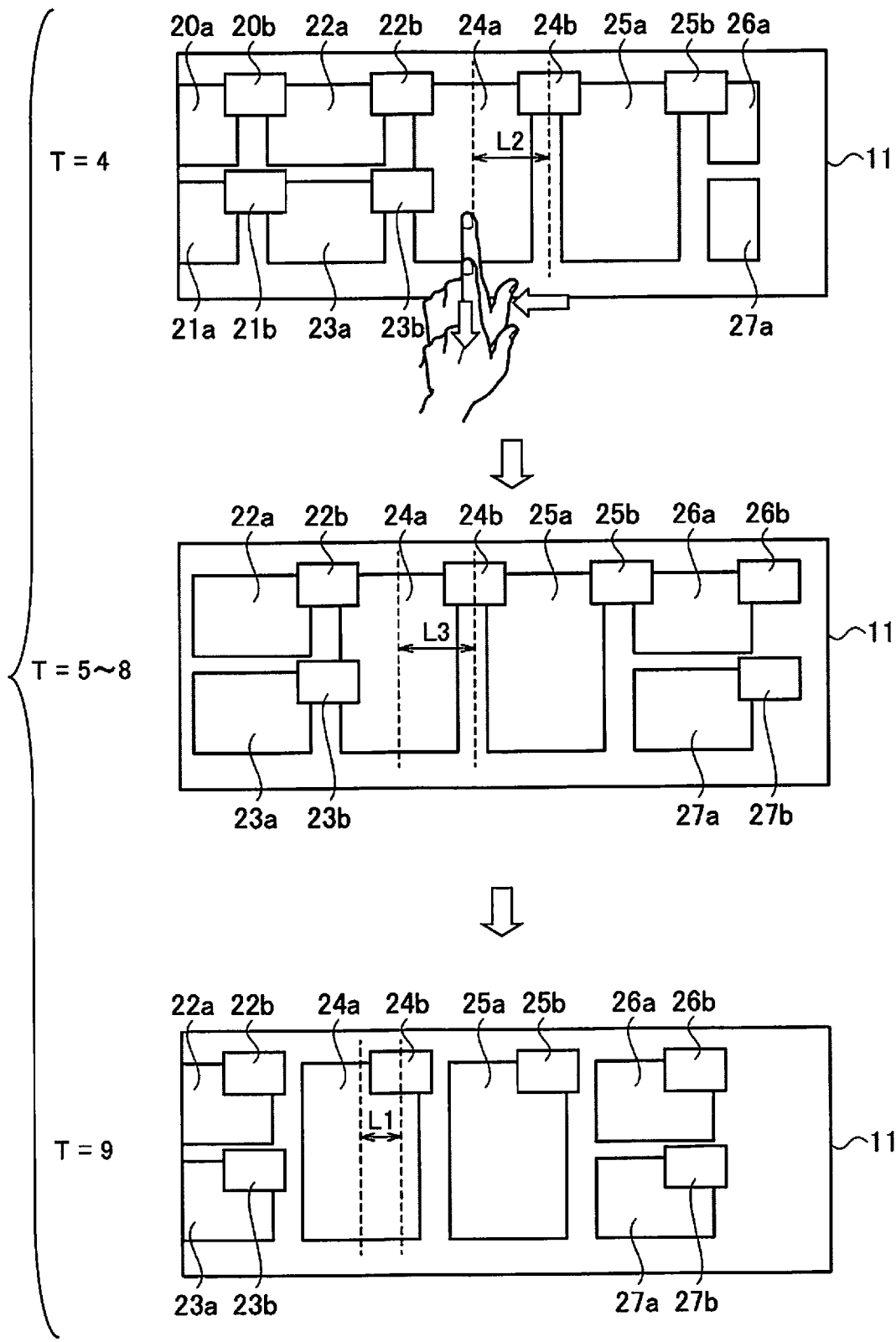
FIG. 6 is a diagram for explaining an example of the movement of the tiles 20a-25a and the icons 20b-25b.

T=0 shown in FIG. 4 indicates the moment that the user touches the display 11. Thereafter, the user scrolls the screen to the left (T=1-3). "Scrolling" is a method for displaying content that does not fit the screen by sliding horizontally or vertically. "Scrolling" is a well-known technique, and is mainly used in smartphones, tablet terminals, and the like. In the present embodiment, the direction in which the user scrolls is the horizontal direction (left-right direction) of the display 11, as shown in FIG. 4.

In the present embodiment, when the user scrolls on the display 11, the relative positions between the tiles and the icons change. This will be described in detail. First, the relative positions of the tiles and the icons before the user scrolls will be described. T=0 shown in FIG. 4 is the moment that the user touches the display 11, and so the user has not yet scrolled. Thus, the image displayed at T=0 corresponds to an image before the user scrolls. By general definition, a relative position is the relative position of one as viewed from the other. In the present embodiment, the relative position is expressed in terms of distance. That is, in the present embodiment, the relative position is defined as "the distance to the icon as viewed from the tile." More specifically, the relative position is defined as the "shortest distance to a center line of the icon as viewed from a center line of the tile." In FIG. 4, the "shortest distance to the center line of the icon as viewed from the center line of the tile" is indicated by the reference symbol L1. Thus, the relative position between the tile 24a and the icon 24b is expressed as the shortest distance L1 to the center line of the icon 24b as viewed from the center line of the tile 24a. The center line means a conceptual line. The center line is not actually displayed on the display 11. Although there is only one reference symbol L1 indicating the relative position in FIG. 4, this is simply because the other ones are omitted. The definition of the relative position is the same for the tiles 20a-23a, 25a and the icons 20b-23b, 25b.

When it is detected that the user has scrolled to the left, as in T=1-3 shown in FIG. 4, the controller 10 scrolls the entire screen to the left. As a result, the tiles 20a-25a and the icons 20b-25b move to the left. In conjunction therewith, tiles 26a, 27a appear from the right end of the display 11. Because the scroll detection method is well-known, a detailed description thereof will be omitted.

Figure 7:
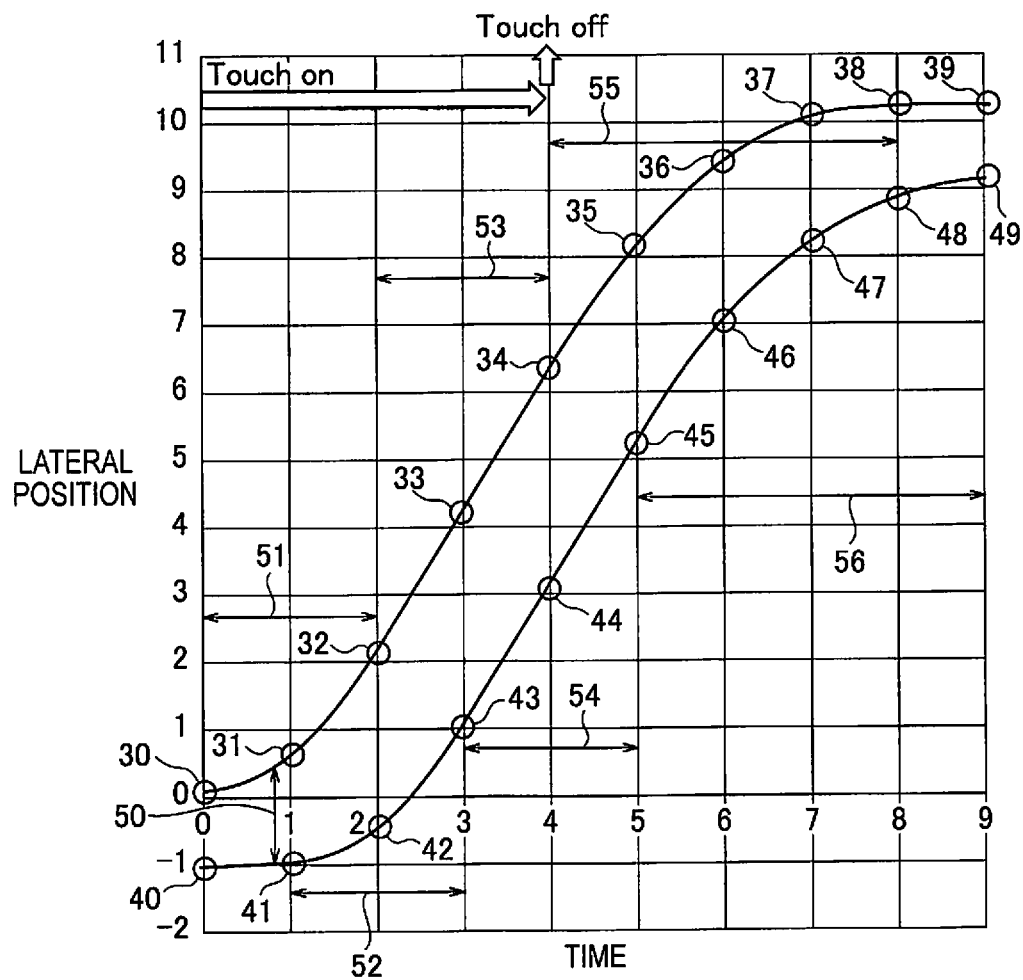
FIG. 7 is a diagram for explaining an example of the movement of the tiles 20a-25a and the icons 20b-25b.

Details of the movements of the tiles and the icons at T=1, T=2, and T=3 will be described next with reference to FIG. 7. In the graph shown in FIG. 7, the horizontal axis indicates time (T) and the vertical axis indicates the lateral position on the display 11. Regarding the positive/negative of the lateral position, the left side of the display 11 is positive and the right side is negative. Reference symbols 30-39 indicate the lateral positions of a tile (the tile 24a here, as a representative). Reference symbols 40-49 indicate the lateral positions of an icon (the icon 24b here, as a representative). As shown in FIG. 7, at T=0, that is, before the user scrolls the screen, the relative distance L1 between the tile 24a and the icon 24b is "1." This numerical value "1" is a standardized numerical value. Such standardized numerical values include some errors, but the errors are minimal. In FIG. 7, the relative distance between the tile 24a and the icon 24b is indicated by the reference symbol 50. The reason for employing the reference symbol 50 instead of "L1" is to indicate that the relative distance between the tile 24a and the icon 24b changes. From T=0-1, the user scrolls the screen to the left. At this time, the controller 10 moves the tiles 20a-25a and the icons 20b-25b to the left. The movements of the tile 24a and the icon 24b will be taken up as examples below. From T=0-1, the controller 10 moves the tile 24a to the left at a prescribed acceleration. In FIG. 7, from T=0-1, the reference symbol 30 (lateral position "0") moves to the reference symbol 31 (lateral position "0.5"). This indicates that the tile 24a is moving to the left at a prescribed acceleration (refer to FIG. 4). In FIG. 7, from T=0-1, the lateral positions of the reference symbol 40 (lateral position "−1") and the reference symbol 41 (lateral position "−1") are the same. That is, from T=0-1, the controller 10 moves the tile 24a to the left at a prescribed acceleration but does not move the icon 24b. Again, because the tile 24a described in FIG. 7 represents the tiles 20a-25a, it goes without saying that the description in FIG. 7 also applies to the tiles 20a-25a. Similarly, because the icon 24b described in FIG. 7 represent the icons 20b-25b, it goes without saying that the description of FIG. 7 also applies to the icons 20b-25b. The same applies to the descriptions below.

In this manner, when it is detected that the user has started scrolling, the controller 10 moves the tile 24a first. The relative distance between the tile 24a and the icon 24b thereby increases. The relative distance after the increase is indicated by the reference symbol L2 in FIG. 4. As shown in FIG. 7, the length of the reference symbol 50 (distance between the reference symbol 30 and reference symbol 40) at T=0 is "1" and the length of the reference symbol 50 (distance between the reference symbol 31 and the reference symbol 41) at T=1 is "1.5." That is, the controller 10 moves the tile 24a first, thereby increasing the relative distance between the tile 24a and the icon 24b by a factor of 1.5 between T=0-1.

From T=1-2, the reference symbol 31 (lateral position "0.5") moves to the reference symbol 32 (lateral position "2.2"). This indicates that the tile 24a is continuing to move to the left at a prescribed acceleration. In addition, from T=1-2, the reference symbol 41 (lateral position "4") moves to the reference symbol 42 (lateral position "−0.5"). This indicates that the icon 24b is moving to the left at a prescribed acceleration. That is, the controller 10 first moves the tile 24a to the left, and then moves the icon 24b to the left. The acceleration at which the tile 24a is moved is greater than the acceleration at which the icon 24b is moved. Thus, the relative distance between the tile 24a and the icon 24b increases further at T=2. Compared to T=0, it increases to about 2.7 times at T=2. The length of the reference symbol 50 (distance between the reference symbol 32 and reference symbol 42) at T=2 is "2.7." The reference symbol 51 indicates that the tile 24a is moving at a constant acceleration from T=0-2. From T=0-2, the trajectory of movement of the tile 24a forms a quadratic curve.

From T=2-3, the reference symbol 32 (lateral position "2.2") moves to the reference symbol 33 (lateral position "4.2"). This indicates that the tile 24a is moving to the left at a prescribed speed. In addition, from T=2-3, the reference symbol 42 (lateral position "−0.5") moves to the reference symbol 43 (lateral position "1"). This indicates that the icon 24b is continuing to move to the left at a prescribed acceleration. The length of the reference symbol 50 (distance between the reference symbol 33 and reference symbol 43) at T=3 is "3.2." The reference symbol 52 indicates that the icon 24*b* is moving at a constant acceleration from T=1-3. From T=1-3, the trajectory of movement of the icon 24*b* forms a quadratic curve.

From T=3-4, the reference symbol 33 (lateral position "4.2") moves to the reference symbol 34 (lateral position "6.4"). This indicates that the tile 24*a* is continuing to move to the left at a prescribed speed. In addition, from T=3-4, the reference symbol 43 (lateral position "1") moves to the reference symbol 44 (lateral position "3.2"). This indicates that the icon 24*b* is moving to the left at a prescribed speed. The length of the reference symbol 50 (distance between the reference symbol 34 and reference symbol 44) at T=4 is "3.2." The reference symbol 53 indicates that the tile 24*a* is moving at a constant speed from T=2-4. From T=0-4, the appearance of the tile 24*a* and the icon 24*b* changes from that of FIG. 3 to that of FIG. 5, as an example.

In the example shown in FIG. 7, the user starts scrolling at T=0 and stops scrolling at T=4. Strictly speaking, because T=0 is the moment of touch, scrolling is started at the next moment after T=0. In FIG. 7, the period during which the user is scrolling is indicated by "touch on." Sopping the scrolling means that the user removes the finger from the display 11. In FIG. 7, the stopping of scrolling is indicated by "touch off." The screen when the user stops scrolling is indicated by T=4 of FIG. 6.

In the present embodiment, if it is detected that the user has stopped scrolling, the controller 10 decelerates and stops the tile 24*a* and the icon 24*b*. The decelerations and stoppages are shown in T=4, T=5-8, and T=9 in FIG. 6. Details of the movements of the tiles and the icons at T=4-9 will be described with reference to FIG. 7. As shown in FIG. 7, from T=4-5, the reference symbol 34 (lateral position "6.4") moves to the reference symbol 35 (lateral position "8.2"). This indicates that the tile 24*a* is moving to the left at a prescribed deceleration. From T=4-5, the reference symbol 44 (lateral position "3.2") moves to the reference symbol 45 (lateral position "5.4"). This indicates that the icon 24*b* is continuing to move to the left at a prescribed speed. That is, when it is detected that the user has stopped scrolling, the controller 10 decelerates the tile 24*a* first. The relative distance between the tile 24*a* and the icon 24*b* thereby decreases. The relative distance after the decrease is indicated by the reference symbol "L3" in FIG. 6. The length of the reference symbol 50 (distance between the reference symbol 35 and reference symbol 45) at T=5 is "2.8." The controller 10 decelerates the tile 24*a* first, thereby decreasing the relative distance between the tile 24*a* and the icon 24*b* from "L2" (3.2) to "L3" (2.8). The reference symbol 54 indicates that the icon 24*b* is moving at a constant speed from T=3-5.

As shown in FIG. 7, from T=5-6, the reference symbol 35 (lateral position "8.2") moves to the reference symbol 36 (lateral position "9.5"). This indicates that the tile 24*a* is continuing to move to the left at a prescribed deceleration. From T=5-6, the reference symbol 45 (lateral position "5.4") moves to the reference symbol 46 (lateral position "7"). This indicates that the icon 24*b* is moving to the left at a prescribed deceleration. That is, the controller 10 first decelerates the tile 24*a*, and then decelerates the icon 24*b*. The deceleration of the tile 24*a* and the deceleration of the icon 24*b* are the same. Thus, the relative distance between the tile 24*a* and the icon 24*b* decreases further at T=6. The length of the reference symbol 50 (distance between the reference symbol 36 and reference symbol 46) at T=6 is "2.5."

From T=6-7, the reference symbol 36 (lateral position "9.5") moves to the reference symbol 37 (lateral position "10.1"). This indicates that the tile 24*a* is continuing to move to the left at a prescribed deceleration. From T=6-7, the reference symbol 46 (lateral position "7") moves to the reference symbol 47 (lateral position "8.2"). This indicates that the icon 24*b* is continuing to move to the left at a prescribed deceleration. The length of the reference symbol 50 (distance between the reference symbol 37 and reference symbol 47) at T=7 is "1.9."

From T=7-8, the reference symbol 37 (lateral position "10.1") moves to the reference symbol 38 (lateral position "10.2"). This indicates that the tile 24*a* is continuing to move to the left at a prescribed deceleration. From T=7-8, the reference symbol 47 (lateral position "8.2") moves to the reference symbol 48 (lateral position "8.9"). This indicates that the icon 24*b* is continuing to move to the left at a prescribed deceleration. The length of the reference symbol 50 (distance between the reference symbol 38 and reference symbol 48) at T=8 is "1.3." The reference symbol 55 indicates that the tile 24*a* is moving at a constant deceleration from T=4-8. From T=4-8, the trajectory of movement of the tile 24*a* forms a quadratic curve.

From T=8-9, the lateral positions of the reference symbol 38 (lateral position "10.2") and the reference symbol 39 (lateral position "10.2") are the same. That is, from T=8-9, the controller 10 stops the tile 24*a*. From T=8-9, the reference symbol 48 (lateral position "8.9") moves to the reference symbol 49 (lateral position "9.2"). This indicates that the icon 24*b* is continuing to move to the left at a prescribed deceleration. That is, the controller 10 first stops the tile 24*a*, and then stops the icon 24*b*. The relative distance between the tile 24*a* and the icon 24*b* thereby returns to the original distance. In the present embodiment, "the relative distance returns to the original distance" means returning to the state before the user starts scrolling. Thus, at T=9 in FIG. 6, the relative distance between the tile 24*a* and the icon 24*b* returns to "L1" at T=0 in FIG. 4. The length of the reference symbol 50 (distance between the reference symbol 39 and reference symbol 49) at T=9 shown in FIG. 7 is "1." The reference symbol 56 indicates that the icon 24*b* is moving at a constant deceleration from T=5-9. From T=5-9, the trajectory of movement of the icon 24*b* forms a quadratic curve.

As shown in FIG. 7, the relative position between the tile 24*a* and the icon 24*b* is indicated by a quadratic function. The values of the acceleration, speed, and deceleration described in FIG. 7 can be changed as appropriate. Thus, the curve shown in FIG. 7 can be changed as appropriate as long as the curve can be represented by a quadratic function. Thus, the "relative position" and the "relative distance" described above are merely slight differences in expression and the intentions thereof are the same.

Figure 8:
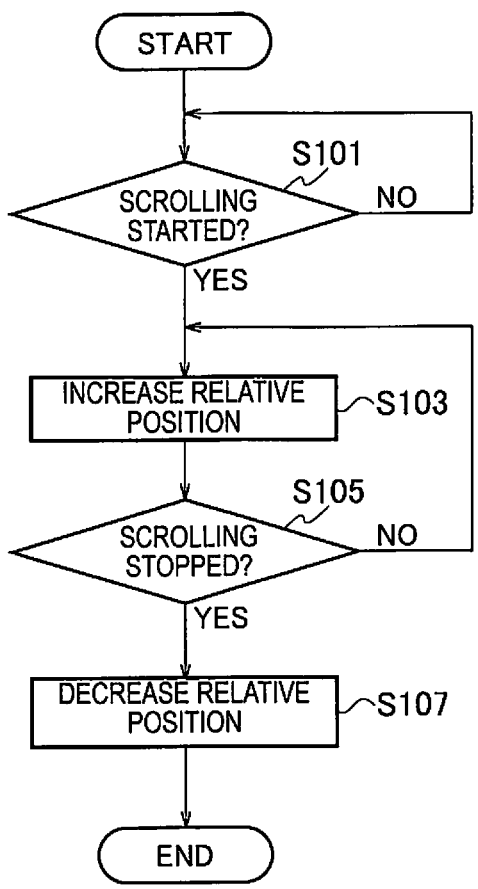
FIG. 8 is a flowchart showing an example of an operation of the display control device 1 according to the embodiment of the present invention.

One operation example of the display control device 1 will be described next with reference to the flowchart of FIG. 8.

In Step S101, the controller 10 detects a start trigger indicating that the user has started scrolling to the left or the right on the display 11. As described above, the method for detecting such a start trigger is well known. If a start trigger is detected (YES in Step S101), the process proceeds to Step S103. In Step S103, the controller 10 increases the relative positions between the tiles 20*a*-25*a* and the icons 20*b*-25*b*. The increase control is carried out until a scroll stop is detected (NO in Step S105). If a scroll stop is detected (YES in Step S105), the controller 10 decreases and returns the relative positions between the tiles 20a-25a and the icons 20b-25b to the original relative positions.

As described above, the following actions and effects can be achieved by means of the display control device 1 according to the present embodiment.

The display control device 1 comprises the display 11 that is capable of touch operation and the controller 10 that controls an image displayed on the display 11. The display 11 and the controller 10 are installed in a vehicle. A tile that activates an application by means of a user's touch, and an icon related to the application are displayed on the display 11. At least a part of the icon is displayed as overlapping the tile. The controller 10 detects a start trigger indicating that the user has started scrolling to the left or right on the display 11. The controller 10 increases the relative position between the tile and the icon at a prescribed acceleration with the passage of time from the detected start trigger. The controller 10 detects a stop trigger indicating that the user has stopped scrolling. The controller 10 decreases the relative position between the tile and the icon at a prescribed deceleration with the passage of time from the detected stop trigger. By changing the relative position between the tile and the icon in this manner, it is possible to emphasize that the image is one in which an icon is displayed in front of the tile. The user can visually confirm an icon related to a tile easily by means of the parallax effect, and easily ascertain the content of an application from the shape of the icon (for example, the shape of a smartphone). In particular, it becomes possible to easily distinguish between a tile and an icon during scrolling.

The passage of time from the detected start trigger means the time elapsed while the user is scrolling. To explain using FIGS. 4 and 7, the passage of time from the detected start trigger means the time elapsed from T=0 to T=4. Similarly, the passage of time from the detected stop trigger means the time elapsed after the user stopped scrolling. To explain using FIGS. 4 and 7, the passage of time from the detected stop trigger means the time elapsed from T=4 to T=9. The prescribed acceleration and the prescribed deceleration can be obtained in advance by means of experimentation and simulation. The pair of tiles and icons may be one pair, or a plurality of pairs. In the present embodiment, the pair of tiles and icons has been described as a plurality of pairs.

The relative position between the tile and the icon is represented by a quadratic function (refer to FIG. 7). The parallax effect is thereby improved.

A plurality of tiles and icons are displayed on the display 11. When there is a plurality of pairs of tiles and icons in this manner, the controller 10 may increase the distance between adjacent tiles at a prescribed acceleration with the passage of time from the detected start trigger. An example of adjacent tiles are the tile 24a and the tile 25a shown in FIG. 4. By increasing the distance between adjacent tiles in this manner, the parallax effect is improved. In addition, the controller 10 may reduce the distance between adjacent tiles at a prescribed deceleration with the passage of time from the detected stop trigger.

Additionally, when the start trigger is detected, the controller 10 moves the tile first at a prescribed acceleration and then moves the icon at a prescribed acceleration. It is thereby possible to emphasize the fact that the image is one in which an icon is displayed in front of a tile.

If a scroll in a different direction by the user is detected when moving the tile and/or the icon, the controller 10 may decrease the relative position between the tile and the icon. The controller 10 then stops the movement of the tile and the icon. Next, the controller 10 moves the tile and the icon in a different direction at a prescribed acceleration, to thereby increase the relative position between the tile and the icon. It is thereby possible to emphasize that the image is one in which an icon is displayed in front of a tile in accordance with the scrolling direction. The "different direction" used herein means the right direction, for example, if the user first scrolls to the left and then scrolls to the right.

When moving a tile, the controller 10 may tilt the orientation of the tile in the direction of movement. The parallax effect is thereby improved.

The center position of the tile and the center position of the icon do not coincide in the horizontal direction of the display 11. As shown in FIGS. 2 and 3, as long as the center position of the tile and the center position of the icon do not coincide in the horizontal direction of the display 11, the icons may be disposed at any position. By shifting the center position of the tile and the center position of the icon in the horizontal direction of the display 11 in this manner, the parallax effect is improved.

The stop trigger is a detection signal indicating that the user has removed the finger from the display 11.

The controller 10 may increase the prescribed acceleration or the prescribed deceleration, as the speed or acceleration of the user's scrolling increases. The parallax effect is thereby improved.

The controller 10 may increase the maximum value of the relative position, as the speed or acceleration of the user's scrolling increases. In the present embodiment, the maximum value of the relative position is described as "3.2," but this "3.2" may be increased as the speed or acceleration of the user's scrolling increases. The parallax effect is thereby improved.

Each of the functions described in the embodiments above may be implemented by means of one or more processing circuits. The processing circuits include programmed processing devices, such as processing devices including electrical circuits. In addition, the processing circuits include devices such as circuit components and application specific integrated circuits (ASIC) arranged to execute the described functions.

An embodiment of the present invention has been described above, but the descriptions and figures that form part of this disclosure should not be understood as limiting the present invention. From this disclosure, various alternative embodiments, examples, and operating techniques should be apparent to those skilled in the art.

The invention claimed is:

1. A display control device comprising: a display configured to be installed in a vehicle and capable of touch operation; and a controller configured to control an image displayed on the display, the display being configured to display a tile that activates an application by a user's touch, and an icon related to the application, at least a part of the icon is displayed as overlapping the tile, and the controller being configured to detect a start trigger indicating that a user has started scrolling left or right on the display, increase a relative position between the tile and the icon at a prescribed acceleration with a passage of time from detection of the start trigger, detect a stop trigger indicating that the user has stopped scrolling, and decrease the relative position between the tile and the icon at a prescribed deceleration with a passage of time from detection of the stop trigger.

2. The display control device according to claim 1, wherein
the relative position between the tile and the icon is represented by a quadratic function.

3. The display control device according to claim 1, wherein
a plurality of the tiles and the icons are displayed on the display, and
the controller is configured to
increases distance between adjacent tiles at the prescribed acceleration with the passage of time from the detection of the start trigger, and
decreases the distance between the adjacent tiles at the prescribed deceleration with the passage of time from the detection of the stop trigger.

4. The display control device according to claim 1, wherein
the controller is configured to first move the tile first at the prescribed acceleration and then move the icon at the prescribed acceleration upon detection of the start trigger.

5. The display control device according to claim 1, wherein
upon the controller detecting the scrolling in a different direction by the user while moving at least one of the tile and the icon, the controller is configured to decrease the relative position of the tile and the icon,
then the controller is configured to stop movement of the tile and the icon, and
then the controller is configured to move the tile and the icon at the prescribed acceleration in different directions to increase the relative position between the tile and the icon.

6. The display control device according to claim 1, wherein
the controller is configured to tilt an orientation of the tile in a direction of movement when moving the tile.

7. The display control device according to claim 1, wherein
a center position of the tile and a center position of the icon do not coincide in the horizontal direction of the display.

8. The display control device according to claim 1, wherein
the stop trigger is a detection signal indicating that the user has removed a finger from the display.

9. The display control device according to claim 1, wherein
at least one of the prescribed acceleration and the prescribed deceleration increases as a speed or an acceleration of the scrolling by the user increases.

10. The display control device according to claim 1, wherein
a maximum value of the relative position increases as the speed or acceleration of scrolling by the user increases.

11. A display control method for display control device comprising a display configured to be installed in a vehicle and capable of touch operation and a controller for controlling an image displayed on the display, wherein
displaying a tile that activates an application by a user's touch, and an icon related to the application,
at least a part of the icon being displayed as overlapping the tile, and
the controller
detecting a start trigger indicating that a user has started scrolling left or right on the display,
increasing a relative position between the tile and the icon at a prescribed acceleration with a passage of time from detection of the start trigger,
detecting a stop trigger indicating that the user has stopped scrolling, and
reducing the relative position between the tile and the icon at a prescribed deceleration with a passage of time from detection of the stop trigger.

* * * * *